F. J. HAMROCK.
VEHICLE WHEEL.
APPLICATION FILED MAR. 4, 1918.
1,269,810.
Patented June 18, 1918.
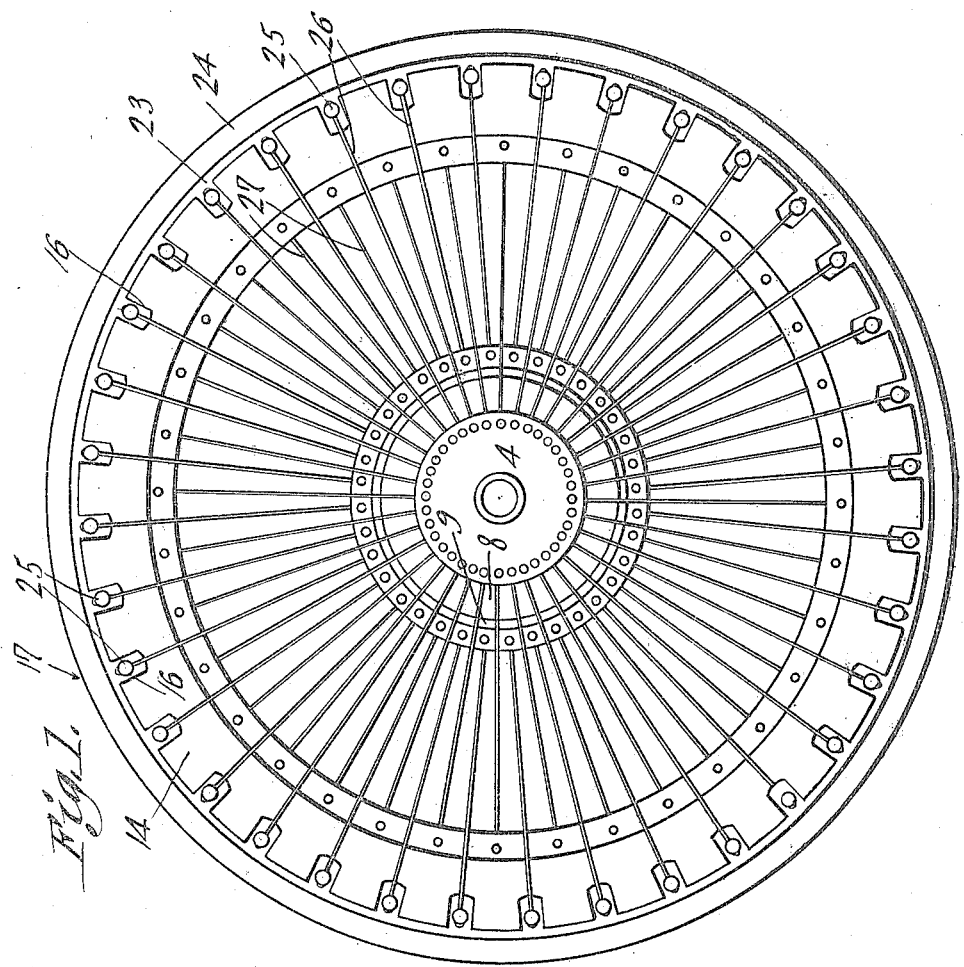
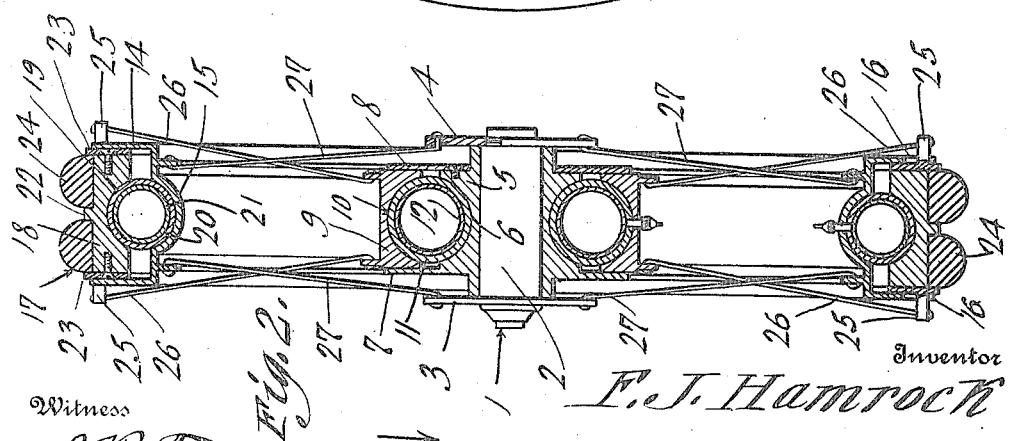
Witness
Inventor
F. J. Hamrock
By
Attorneys

UNITED STATES PATENT OFFICE.

FRANK J. HAMROCK, OF HOMESTEAD, PENNSYLVANIA.

VEHICLE-WHEEL.

1,269,810.　　　　Specification of Letters Patent.　　Patented June 18, 1918.

Application filed March 4, 1918. Serial No. 220,248.

*To all whom it may concern:*

Be it known that I, FRANK J. HAMROCK, a citizen of the United States, residing at Homestead, in the county of Allegheny and State of Pennsylvania, have invented a new and useful Vehicle-Wheel, of which the following is a specification.

The device forming the subject matter of this application is a vehicle wheel, and the invention aims to provide novel means whereby through the instrumentality of a cushioning element located in the hub, combined with a cushioning element located in the rim, the necessary resiliency will be afforded.

It is within the province of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a device constructed in accordance with the present invention; and Fig. 2 is a transverse section of the structure delineated in Fig. 1.

In carrying out the invention there is provided a hub, denoted generally by the numeral 1, the hub being a composite structure. The hub includes a tubular bearing 2 carrying a fixed side plate 3 and a removable side plate 4. An annular member 5 surrounds the bearing 2 and is held against lateral movement by the plates 3 and 4. the annular member having a channel 6. The annular member 5 embodies a fixed side plate 7 and a removable side plate 8. The elements above alluded to comprise the hub 1.

A ring 9 is mounted for sliding movement between the plates 7 and 8 of the hub and is supplied with a channel 10 complemental to the channel 6 in the hub. A cushion is mounted in the channels 10 and 6 and preferably includes a casing 11 inclosing an inflatable inner tube 12.

The numeral 14 marks a trough-shaped rim having a channel 15 and provided in its sides and at its edges with notches 16. A tread 17 is mounted to slide in the rim 14 and includes a base ring 18 having a channel 19 complemental to the channel 15 of the rim 14. In the channels 19 and 15 is disposed a cushion, comprising a casing 20 and an inflatabe inner tube 21 within the casing. The base ring 18 of the tread is supplied with an intermediate rib 22. Side plates 23 are attached removably to the base ring 18, and tires 24 are held between the side plates and the rib. Generally stated, any desired tire construction may be used without departing from the spirit of the invention.

The side plates 23 which are secured to the base ring 8 have laterally extended lugs 25 which work in the notches 16 of the channel 15 with sufficient play to make the structure operative. Spokes 26 connect the lugs 25 with the ring 9, and spokes 27 connect the rim 14 with the fixed plates 3 and 4 which constitute a part of the hub 1.

In operation, let it be supposed that there is a downward pressure on the hub 1 as shown by the arrow in Fig. 2. The channel-shaped rim 14 is carried downwardly, since the rim and the hub are connected by the spokes 27. The tread 17 is rigid and in contact with the ground, and does not move downwardly. The bottom portion of the cushion 20—21 is compressed. The ring 9 is connected with the tread 17 by the spokes 26 and cannot move downwardly. Therefore, the lower portion of the cushion 11—12 is compressed. The lugs 25 being received in the notches 15 of the rim 14 prevent excessive creeping between the tread 17 and the rim.

Having thus described the invention, what is claimed is:—

A spring wheel embodying a hub; a ring spaced from the hub; a cushion interposed between the hub and the ring; a channel-shaped rim having openings in its side walls;

a tread slidably received between the side walls of the rim and having lugs received for movement in the openings; a cushion interposed between the tread and the rim; spokes connecting the lugs and the ring; and spokes connecting the hub with the rim.

In testimony that I claim the foregoing as my own, I have hereto affixed my signature in the presence of two witnesses.

FRANK J. HAMROCK.

Witnesses:
GEORGE N. SMITH,
T. J. GILLESPIE.

Copies of this patent may be obtained for five cents each, by addressing the "Commissioner of Patents, Washington, D. C."